(12) United States Patent
Kim

(10) Patent No.: US 7,072,419 B2
(45) Date of Patent: Jul. 4, 2006

(54) DATA COMMUNICATION APPARATUS AND METHOD BASED ON ORTHOGONAL FREQUENCY DIVISION MULTIPLE ACCESS

(75) Inventor: Yung-soo Kim, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 838 days.

(21) Appl. No.: 10/102,805

(22) Filed: Mar. 22, 2002

(65) Prior Publication Data

US 2002/0168022 A1 Nov. 14, 2002

(30) Foreign Application Priority Data

Mar. 26, 2001 (KR) ............... 2001-15641

(51) Int. Cl.
*H04L 27/04* (2006.01)
*H04J 11/00* (2006.01)

(52) U.S. Cl. .................. 375/295; 370/210

(58) Field of Classification Search .......... 370/203, 370/208, 210, 329, 341; 375/260, 222, 295, 375/219; 708/400–405; 455/450, 452, 453
See application file for complete search history.

(56) References Cited

U.S. PATENT DOCUMENTS

| 5,519,731 | A * | 5/1996 | Cioffi | 375/260 |
|---|---|---|---|---|
| 5,625,651 | A * | 4/1997 | Cioffi | 375/354 |
| 5,673,290 | A * | 9/1997 | Cioffi | 375/260 |
| 6,035,000 | A * | 3/2000 | Bingham | 375/296 |
| 6,192,026 | B1 * | 2/2001 | Pollack et al. | 370/203 |
| 6,408,033 | B1 * | 6/2002 | Chow et al. | 375/260 |
| 6,850,481 | B1 * | 2/2005 | Wu et al. | 370/208 |
| 2002/0131455 | A1 * | 9/2002 | Cioffi et al. | 370/503 |

FOREIGN PATENT DOCUMENTS

| EP | 1001566 | 5/2000 |
|---|---|---|
| EP | 1056250 | 11/2000 |
| EP | 1069725 | 1/2001 |

OTHER PUBLICATIONS

Bingham, "Multicarrier Modulation for Data Transmission: An Idea Whose Time Has come," IEEE, May 1990, pp. 5-14.*
Chow et al., "DMT—based ADSL: Concept Architecture, and Performance,"IEE, 1994, pp. 1-3.*

* cited by examiner

Primary Examiner—Tesfaldet Bocure
(74) Attorney, Agent, or Firm—Buchanan Ingersoll PC

(57) ABSTRACT

A data communication apparatus and method based on orthogonal frequency division multiple access (OFDMA) are provided. In the data communication apparatus, a (U+1)-th encoder in a u-th user transmitting unit among U user transmitting units which transmit corresponding user information to a base station part encodes the user information and outputting the result of encoding as $N_u$ u-th user symbols. A user signal generator generates a u-th user signal $x_k^{(u)}$ in a temporal domain from the u-th user symbol $A_m^{(u)}$ received from the (U+1)-th encoder according to a formula, $x_k^{(u)} = a_{k\ \%\ N_u}^{(u)} \exp(j2\pi k n_u/N)$. A second cyclic extension symbol inserter inserts a cyclic extension symbol into the u-th user signal. A second signal transmitter converts the result of insertion into a symbol block signal and transmitting the symbol block signal to the base station part. Here, $1 \leq N_u < N$. Accordingly, the hardware of a user part can be optionally simplified very much. Communication efficiency can be increased in a given channel environment. In addition, different types of user parties having different complexities can communicate with a base station part using a single data format.

15 Claims, 13 Drawing Sheets

DATA COMMUNICATION APPARATUS AND METHOD BASED ON ORTHOGONAL FREQUENCY DIVISION MULTIPLE ACCESS

Priority is claimed to patent application Ser. No. 2001-15641 filed in Rep. of Korea on Mar. 26, 2001, herein incorporated by reference.

BACKGROUND OF THE INVENTION

1. Field of the Invention

The present invention relates to data communication, and more particularly, to a data communication apparatus and method based on orthogonal frequency division multiple access (OFDMA).

2. Description of the Related Art

In conventional data communication based on OFDMA, information is transmitted from a base station to a user part in units of data symbol blocks as follows. First, N-point inverse discrete Fourier transform (IDFT) or N-point inverse fast Fourier transform (IFFT) is performed on information to be transmitted (N denotes a total number of symbols to be allocated to users). A symbol block generated by adding a cyclic prefix to the front of a sequence of main symbols having transformed information is transmitted. As a result, in conventional data communication based on OFDMA, an entire frequency band is divided into N small frequency bands (or sub-carriers), and a single data symbol is transmitted through each sub-carrier.

In conventional data communication based on OFDMA, a base station deduces user symbols from a signal received from a user part as follows. First, the start point of each symbol block is found, and a cyclic prefix is removed. Then, N-point DFT or N-point FFT is performed on N samples to convert the N samples into a signal in a frequency domain. Next, signal distortion occurring in each frequency due to a channel is compensated for, and data is detected. Here, a cyclic prefix is added to prevent inter-block interference from occurring due to a channel and needs to be longer than an impulse response of the channel. Here, the value of N needs to be as large as possible in order to increase the efficiency of conventional data communication based on OFDMA. However, with an increase in the value of N, the size of hardware for FFT/IFFT also increases, so it is difficult to realize conventional data communication based on OFDMA.

In normal data communication based on OFDMA, when a plurality of users communicate simultaneously, as many frequencies or sub-carriers as needed are allocated to each user to establish multiple access. Accordingly, each user part transmits data symbols using only some frequencies, and the remaining frequencies are not used for data transmission. Even in this case where data is transmitted at only some frequencies, a user part in conventional data communication based on OFDMA must perform N-point IFFT and N-point FFT, which results in unnecessary waste of hardware.

In a multimedia wireless communication environment in which various speeds and characteristics from a low-speed voice service to a high-speed data service exist together, a user part, that is, a user terminal, including a user transmitting unit and a user receiving unit provides only limited services according to its price or purpose. For example, a low-priced terminal can provide only a low-speed data service such as a voice service, and a high-priced terminal can provide a high-speed data service and a video service. Accordingly, although N should be set to be large in order to increase communication efficiency in the multimedia wireless communication environment, N can be set to be small for a low-speed terminal. However, conventional data communication based on OFDMA complicates the hardware and designs of terminals.

SUMMARY OF THE INVENTION

To solve the above-described problems, it is a first object of the present invention to provide a data communication apparatus based on orthogonal frequency division multiple access (OFDMA), which allows a user transmitting unit and a user receiving unit to be variably and simply realized according to an information transmission speed.

It is a second object of the present invention to provide a data communication method based on OFDMA, which is performed by the data communication apparatus based on OFDMA.

To achieve the first object of the present invention, in one aspect, there is provided a data communication apparatus based on OFDMA including a base station transmitting unit which transmits user information for at least one user. The base station transmitting unit includes first through U-th encoders among which a u-th encoder (where $1 \leq u \leq U$, and U indicates the number of users) encodes the user information and outputs the result of encoding as $N_u$ u-th user symbols (where $N_u$ is the number of symbols allocated to a u-th user); a frequency allocator for allocating different frequencies to the user symbols received from each of the first through U-th encoders and outputting the results of allocation; a first inverse Fourier transformer for performing N-point inverse Fourier transform on the results of allocation received from the frequency allocator (where N is a total number of symbols which can be allocated to the U users); a first cyclic extension symbol inserter for inserting a cyclic extension symbol into the result of inverse Fourier transform; and a first signal transmitter for converting the result of insertion into a symbol block signal and transmitting the symbol block signal to the user. The sum of $N_1$ through $N_u$ is no greater than N.

The data communication apparatus further includes a user receiving unit which receives the symbol block signal transmitted from the base station transmitting units and estimates the u-th user symbol from the received symbol block signal. The user receiving unit includes a second signal receiver for converting the received symbol block signal into a symbol block and outputting the symbol block; a second pre-processor for finding a start point of the symbol block received from the second signal receiver, removing the cyclic extension symbol from the symbol block on the basis of the start point, and outputting the result $r_k$ (where "k" indicates a time index and satisfies $0 \leq k \leq N-1$) of removal; a user signal extractor for extracting a signal $R_n^{(u)}$ in a frequency domain for a u-th user from the result $r_k$ received from the second pre-processor according to the formula, $R_n^{(u)} = BA_m^{(u)} H_n^{(u)} + N'_n$ where n is a frequency index and satisfies $0 \leq n \leq N_u - 1$, B indicates a size control factor, $H_n^{(u)}$ indicates a channel characteristic in a frequency domain, and $N'_u$ indicates a noise characteristic in a frequency domain; a second equalizer for removing inter-channel interference from the signal $R_n^{(u)}$ received from the user signal extractor; and a second estimate value detector for detecting an estimate value $\hat{A}_m^{(u)}$ of the u-th user symbol $A_m^{(u)}$ from the result of removal received from the second equalizer.

To achieve the first object of the present invention, in another aspect, there is provided a data communication apparatus based on OFDMA including U user transmitting units each of which transmits user information to a base station part. A u-th user transmitting unit ($1 \leq u \leq U$) among the U user transmitting units includes a (U+1)-th encoder for encoding the user information and outputting the result of encoding as $N_u$ u-th user symbols (where $N_u$ is the number of symbols allocated to a u-th user); a user signal generator for generating a u-th user signal $x_k^{(u)}$ in a time domain from the u-th user symbol $A_m^{(U)}$ (where $0 \leq m < N_u$) received from the (U+1)-th encoder according to the formula, $x_k^{(u)} = a_{k\% N_u}^{(u)} \exp(j2\pi k n_u/N)$, and outputting the generated u-th user signal $x_k^{(u)}$ where $0 \leq k \leq N-1$, N is a total number of symbols which can be allocated to the U users and is at least the sum of $N_1$ through $N_U$, k % $N_u$ indicates the remainder when "k" is divided by $N_u$, $a_k^{(u)}$ indicates the result of performing inverse Fourier transform on the $N_u$ user symbols $A_m^{(u)}$, and $n_u$ indicates a frequency offset number allocated to a u-th user; a second cyclic extension symbol inserter for inserting a cyclic extension symbol into the u-th user signal; and a second signal transmitter for converting the result of insertion into a symbol block signal and transmitting the symbol block signal to the base station part. Here, $1 \leq N_U \leq N$.

The data communication apparatus further includes a base station receiving unit which receives the symbol block signal transmitted from each of the U user transmitting units and estimates the u-th user symbol from the received symbol block signal. The base station receiving unit includes a first signal receiver for converting the received symbol block signal into a symbol block and outputting the symbol block; a first pre-processor for finding a start point of the symbol block received from the first signal receiver, removing the cyclic extension symbol from the symbol block on the basis of the start point, and outputting the result $r_k$ of removal; a first Fourier transformer for performing N-point Fourier transform on the result $r_k$ of removal received from the first pre-processor; a first equalizer for removing inter-channel interference from the result of Fourier transform received from the first Fourier transformer; and a first estimate value detector for detecting an estimate value of the u-th user symbol $A_m^{(u)}$ from the result of removal received from the first equalizer.

To achieve the second object of the present invention, in one aspect, there is provided a data communication method based on OFDMA through which the base station transmitting unit of the data communication apparatus transmits user information to one or more users. The data communication method includes the steps of encoding each of U pieces of user information to obtain $N_u$ user symbols for each of the users; allocating different frequencies to the respective user symbols for each of the users; performing inverse Fourier transform on the results of frequency allocation; inserting a cyclic extension symbol into the result of inverse Fourier transform; and converting the result of insertion into a symbol block signal and transmitting the symbol block signal to the user.

To achieve the second object of the present invention, in another aspect, there is provided a data communication method based on OFDMA through which the u-th user transmitting unit of the data communication apparatus transmits the user information to the base station part. The data communication method includes the steps of encoding the user information to obtain $N_u$ u-th user symbols; generating a u-th user signal $x_k^{(u)}$ in a time domain from the u-th user symbols $A_m^{(u)}$ according to the formula, $x_k^{(u)} = a_{k\% N_u}^{(u)} \exp(j2\pi k n_u/N)$; inserting the cyclic extension symbol into the u-th user signal; and transmitting the result of insertion to the base station part as the symbol block signal.

To achieve the second object of the present invention, in still another aspect, there is provided a data communication method based on OFDMA through which the base station receiving unit of the data communication apparatus estimates the u-th user symbol from the received symbol block signal. The data communication method includes the steps of converting the received symbol block signal into the symbol block; finding the start point of the symbol block and removing the cyclic extension symbol from the symbol block on the basis of the start point; performing N-point Fourier transform on the result $r_k$ of removal of the cyclic extension symbol; removing the inter-channel interference from the result of Fourier transform; and detecting the estimate value of the u-th user symbol $A_m^{(u)}$ from the result of removal of the inter-channel interference.

To achieve the second object of the present invention, in still another aspect, there is provided a data communication method based on OFDMA through which the user receiving unit of the data communication apparatus estimates the u-th user symbol from the received symbol block signal. The data communication method includes the steps of converting the received symbol block signal into the symbol block; finding the start point of the symbol block and removing the cyclic extension symbol from the symbol block on the basis of the start point; extracting the signal $R_n^{(u)}$ from the result $r_k$ of removal of the cyclic extension symbol; removing the inter-channel interference from the signal $R_n^{(u)}$; and detecting the estimate value $\hat{A}_m^{(u)}$ of the u-th user symbol $A_m^{(u)}$ from the result of removal of the inter-channel interference.

To achieve the second object of the present invention, in still another aspect, there is provided a data communication method based on OFDMA through which the frequency offset number is obtained in the data communication apparatus. The data communication method includes the steps of (a) arranging users in order of ascending $L_u$; (b) initializing the user index "u" and the frequency offset number; (c) increasing the user index "u" by 1, obtaining a value of $b_l \in \{0, 1\}$ satisfying $$\sum_{i=1}^{u-1} L_i^{-1} = \sum_l b_l 2^{-1},$$

and obtaining the frequency offset number using $$\sum_l b_l 2^{i-1};$$

and (d) determining whether the user index "u" is less than the number of users and going to the step (c) if it is determined that the user index "u" is less than the number of users.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, the configuration and operations of a data communication apparatus based on orthogonal frequency division multiple access (OFDMA) according to the present invention will be described with reference to the attached drawings.

Figure 1:
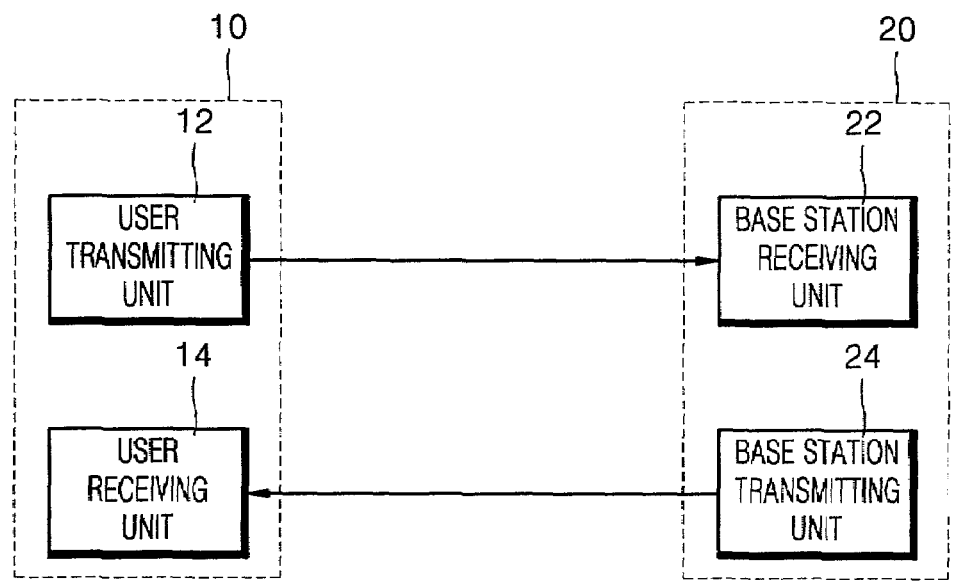
FIG. 1 is a schematic block diagram of a data communication apparatus based on orthogonal frequency division multiple access (OFDMA) according to the present invention.

FIG. 1 is a schematic block diagram of a data communication apparatus based on OFDMA according to the present invention. The data communication apparatus includes a user part 10 having a user transmitting unit 12 and a user receiving unit 14 and a base station part 20 having a base station receiving unit 22 and a base station transmitting unit 24.

There may be as many user parts 10 communicating with the base station part 20 as the number of users. Each of all user parts 10 communicates with the base station part 20 as follows.

Referring to FIG. 1, the user transmitting unit 12 of the data communication apparatus according to the present invention transmits user information, which is encoded in the form of user symbols, to the base station receiving unit 22 in symbol block units composed of at least one main symbol and at least one additional cyclic extension symbol. The base station receiving unit 22 receives user information from each of the one or more user transmitting units 12 in symbol block units and estimates a user symbol transmitted from the user part 10 using the received user information.

The base station transmitting unit 24 of the data communication apparatus of the present invention transmits information for a certain user to the corresponding user receiving unit 14 in symbol block units including at least one main symbol and at least one cyclic extension symbol. Here, the user receiving unit 14 receives the information transmitted from the base station transmitting unit 24 in symbol block units and estimates a symbol with respect to the certain user from the received information.

Hereinafter, the format of information transmitted and received between the user part 10 and the base station part 20 shown in FIG. 1 will be described with reference to the attached drawings.

Figure 2:
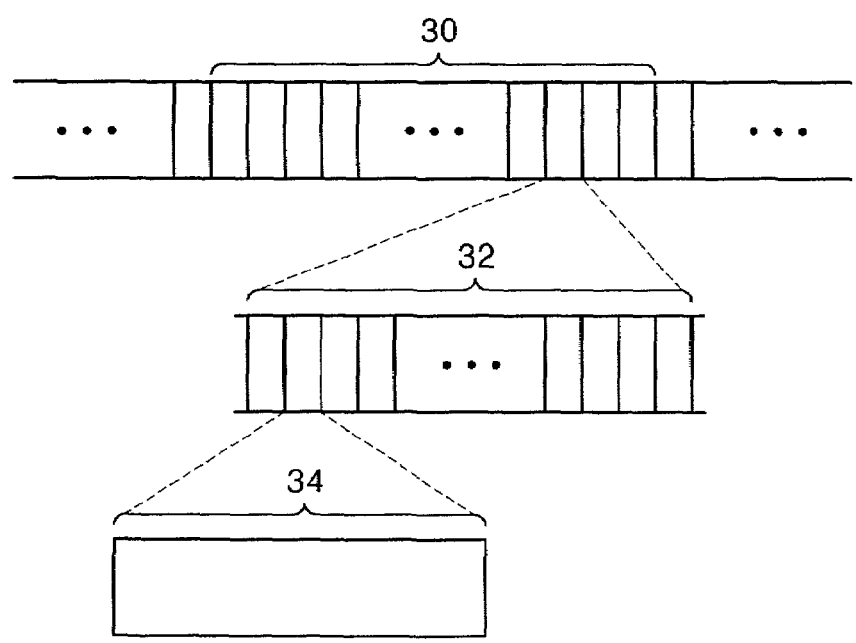
FIG. 2 is a diagram of a data format illustrating relationship among a frame, a time slot, and a symbol block.

FIG. 2 is a diagram of a data format illustrating relationship among a frame, a time slot, and a symbol block. Referring to FIG. 2, a unit frame 30 is composed of at least one time slot. A unit time slot 32 is composed of at least one symbol block. When information is transmitted and received between the user part 10 and the base station part 20 according to a data communication apparatus and method of the present invention, a symbol block 34 can be allocated to a single user or to a plurality of users at a time. In other words, according to the present invention, the scheme of allocation of the symbol block 34 is not fixed within one frame but is different among symbol slots.

Figure 3:
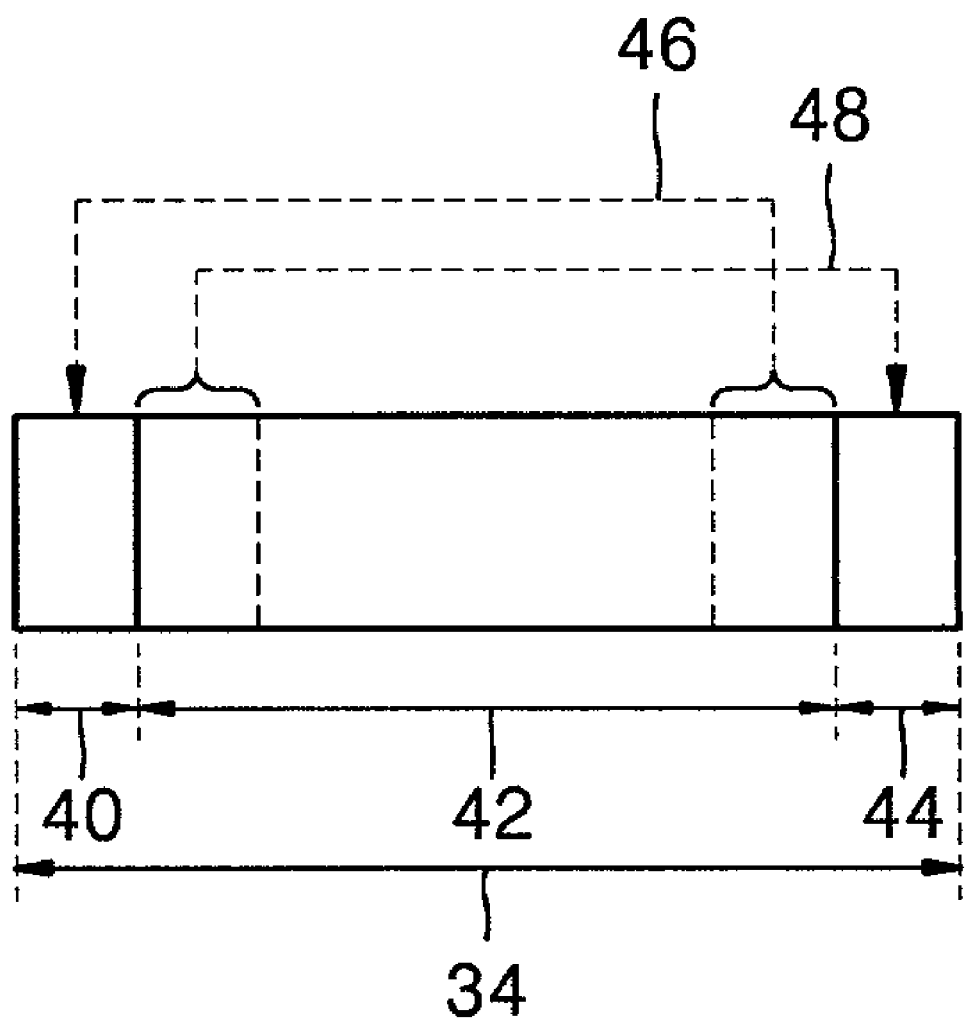
FIG. 3 is a diagram of the format of the symbol block shown in FIG. 2.

FIG. 3 is a diagram of the format of the symbol block 34 shown in FIG. 2. The symbol block 34 is composed of cyclic extension symbols 40 and 44 and main symbols 42.

Referring to FIG. 3, the symbol block 34 is composed of N main symbol(s) (N is a total number of symbols which can be allocated to all users, that is, the number of subcarriers) 42 and $N_p$ cyclic extension symbol(s) ($N_p$ is 1 or an integer greater than 1) 40. The symbol block 34 can additionally include $N_q$ cyclic extension symbol(s) ($N_q$ is 1 or an integer greater than 1) 44. In other words, the cyclic extension symbol(s) 40 is usually necessarily added at the front of the symbol block 34, but the cyclic extension symbol(s) 44 added at the rear of the symbol block 34 can be omitted. The last $N_p$ main symbol(s) of the N main symbol(s) 42 is copied to the front of the symbol block 34 to form the cyclic extension symbol(s) 40, as indicated by an arrow 46, and the first $N_q$ main symbol(s) of the N main symbol(s) 42 is copied to the rear of the symbol block 34 to form the cyclic extension symbol(s) 44, as indicated by an arrow 48. Here, if N indicating the number of main symbols 42 is set to a value of an exponential with base 2 (i.e., $N \in \{2^{n'} | n'=1,2,3,\ldots\}$), a data communication apparatus according to the present invention can be much more easily realized. Here, the length $N_p$ or $N_q$ of the cyclic extension symbol(s) 40 or 44 is set to be equal to or greater than the length of a channel impulse response.

When a plurality of pieces of user information transmitted from a plurality of user parties do not reach a base station part exactly at the same time, an arrival time difference is included in the cyclic extension symbol(s) 40 or 44.

Hereinafter, the configuration and the operations of a preferred embodiment of the base station transmitting unit 24 according to the present invention and a data communication method of the present invention through which the base station transmitting unit 24 transmits corresponding user information to the user receiving unit 14 will be described with reference to the attached drawings.

Figure 4:
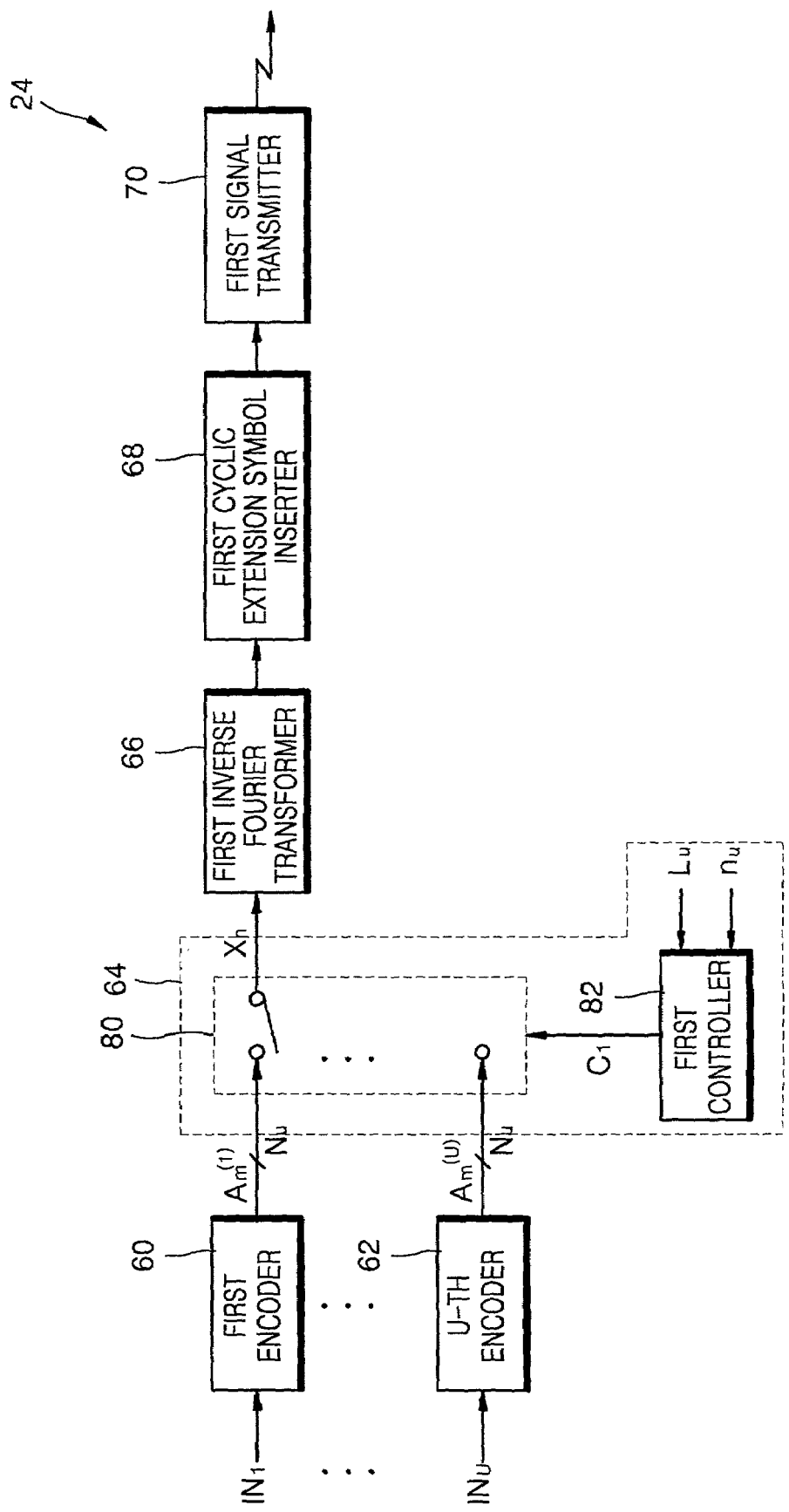
FIG. 4 is a block diagram of a base station transmitting unit according to the present invention.

FIG. 4 is a block diagram of the base station transmitting unit 24 according to the present invention. The base station transmitting unit 24 includes first through U-th encoders 60 through 62, a frequency allocator 64, a first inverse Fourier transformer 66, a first cyclic extension symbol inserter 68, and a first signal transmitter 70.

Figure 5:
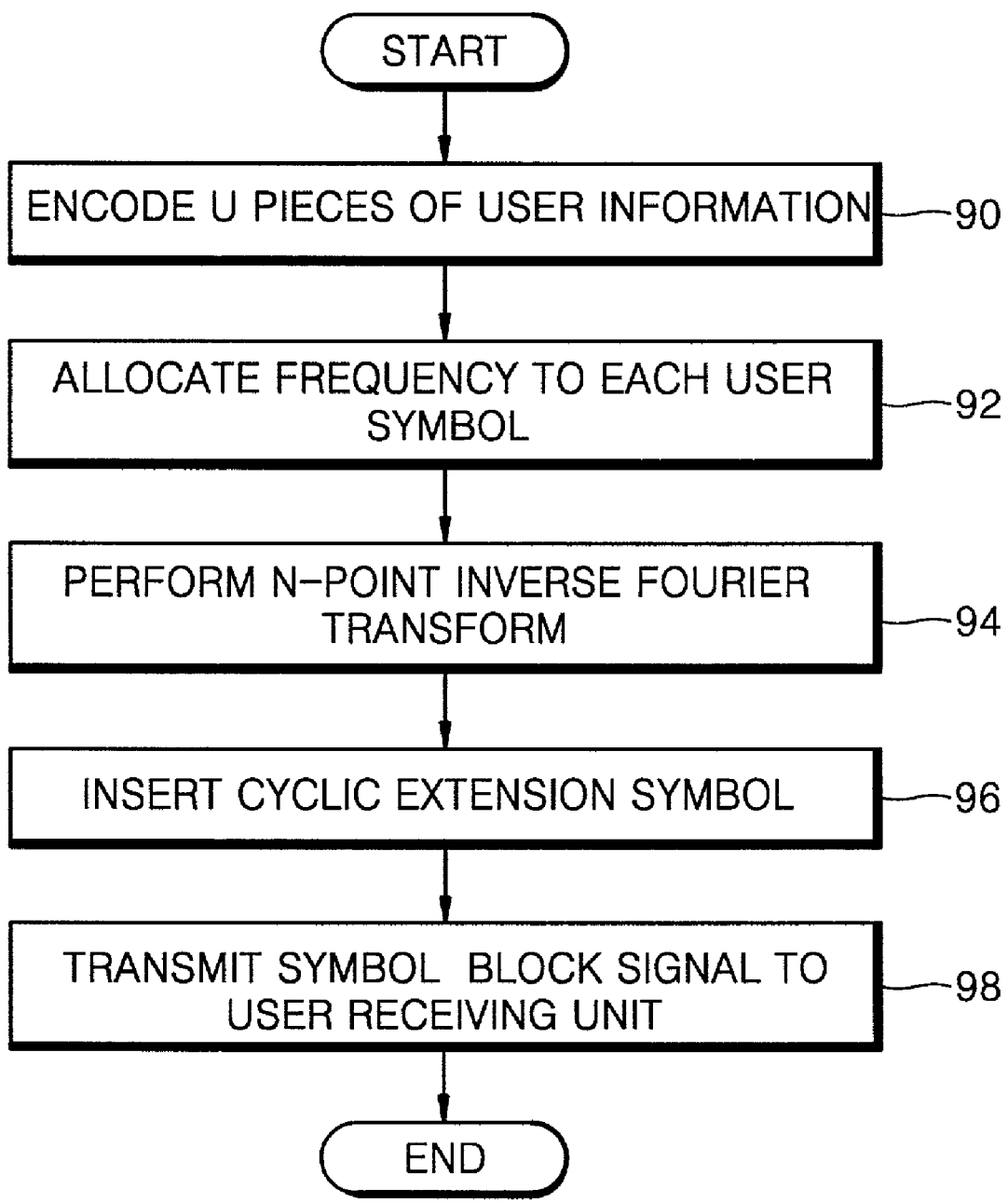
FIG. 5 is a flowchart of a data communication method performed by the base station transmitting unit shown in FIG. 4 according to the present invention.

FIG. 5 is a flowchart of a data communication method performed by the base station transmitting unit 24 shown in FIG. 4 for transmission of user information according to the present invention. In steps 90 and 92, a frequency is allocated to each of user symbols obtained by encoding user information. In steps 94 through 98, a symbol block completed by inserting a cyclic extension symbol into the result of performing inverse Fourier transform on the user symbols allocated frequencies is transmitted.

The base station transmitting unit 24 shown in FIG. 4 serves to transmit corresponding user information to the at least one user receiving unit 14. For this, in step 90, the first through U-th encoders 60 through 62 encode U pieces of user information received through respective input terminals $IN_1$ through $IN_U$, and each of the first through U-th encoders 60 through 62 outputs the result of encoding to the frequency allocator 64 as $N_u$ user symbols $A_m^{(u)}$ for each user. Here, $N_u$ is the number of symbols allocated to a u-th user, and "u" is a user index satisfying $1 < u < U$ and $0 \leq m < N_u$. Here, when $1 \leq N_u \leq N$, the sum of $N_1$ through $N_U$ is no greater than N, and N is set to a value of an exponential with base 2, shown in Formula (1), a data communication apparatus according to the present invention can be much more easily realized. In addition, $N_u$ can be set to a value of an exponential with base 2, as shown in Formula (1).

$$N \in \{2^{n'} | n'=1,2,3,\ldots\}, N_u \in \{2^{n'} | n'=1,2,3,\ldots\} \quad (1)$$

For example, a u-th encoder, one of the encoders 60 through 62, encodes user information received in the form of bits through an input terminal $IN_u$ and outputs the result of encoding as $N_u$ user symbols $A_m^{(u)}$ for a u-th user to the frequency allocator 64.

After step 90, the frequency allocator 64 allocates different frequencies $S_u$ to the $N_u$ user symbols $A_m^{(1)}$ through $N_u$ user symbols $A_m^{(U)}$ output from the first through U-th encoders 60 through 62 for all of the users according to Formula (2) and outputs the results of allocation to the first inverse Fourier Transformer 66 in step 92.

$$S_u = \{n | n = mL_u + n_u\} \quad (2)$$

Here, $L_u$ is $N/N_u$, and $N_u$ indicates a frequency offset number allocated to the u-th user.

To perform the step 92, the frequency allocator 64 can include a first switching unit 80 and a first controller 82. The first switching unit 80 selects one out of the results of encoding received from the first through U-th encoders 60 through 62 in response to a first control signal C1 received from the first controller 82, and outputs the selected one as the result $X_n$ of frequency allocation, which is expressed by Formula (3), to the first inverse Fourier transformer 66.

$$X_n = \sum_{u=1}^{U} X_n^{(u)} \quad (3)$$

Here, "n" is a frequency index and satisfies $0 \leq n \leq N-1$. In Formula (3), $X_n^{(u)}$ is $A_m^{(u)}$ only when $n = mL_u + n_u$, and is otherwise 0. The first controller 82 generates the first control signal C1 in response to $L_u$ and $n_u$ and outputs the first control signal C1 to the first switching unit 80.

After step 92, the first inverse Fourier transformer 66 performs N-point inverse Fourier transform on the result $X_n$ of frequency allocation received from the frequency allocator 64 and outputs the result of N-point inverse Fourier transform to the first cyclic extension symbol inserter 68 in step 94.

After step 94, the first cyclic extension symbol inserter 68 inserts the cyclic extension symbol 40 or the cyclic extension symbols 40 and 44 into the result of N-point inverse Fourier transform received from the first inverse Fourier transformer 66 and outputs the result of insertion to the first signal transmitter 70 in step 96.

After step 96, the first signal transmitter 70 converts the result of insertion received from the first cyclic extension symbol inserter 68 into a symbol block signal and transmits the symbol block signal to the user receiving unit 14 in step 98.

Hereinafter, the configuration and the operations of a preferred embodiment of the user transmitting unit 12 according to the present invention and a data communication method of the present invention through which the user transmitting unit 12 transmits user information to the base station receiving unit 22 will be described with reference to the attached drawings.

Figure 6:
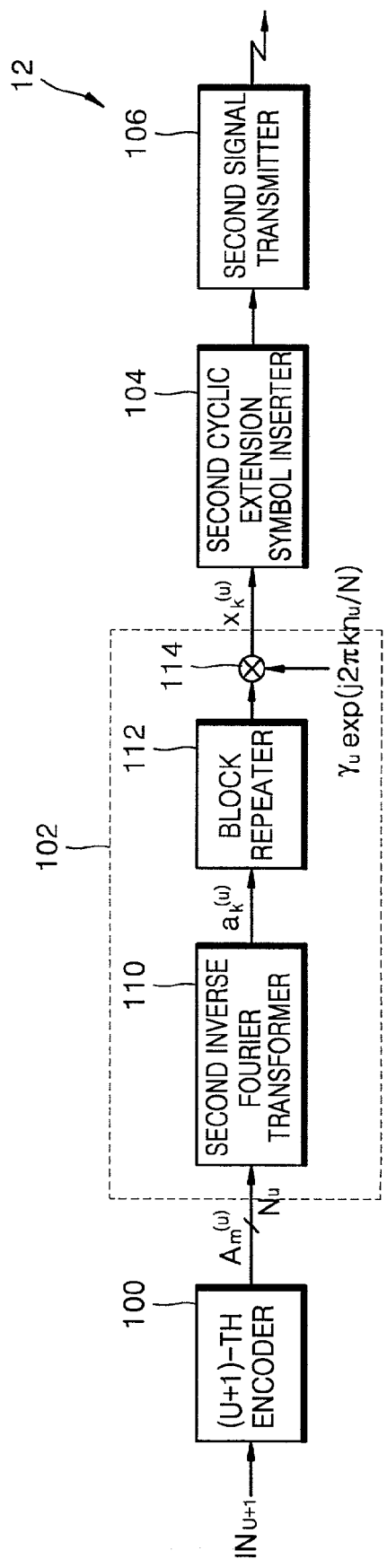
FIG. 6 is a block diagram of a user transmitting unit according to the present invention.

FIG. 6 is a block diagram of the user transmitting unit 12 according to the present invention. The user transmitting unit 12 includes a (U+1)-th encoder 100, a user signal generator 102, a second cyclic extension symbol inserter 104, and a second signal transmitter 106.

Figure 7:
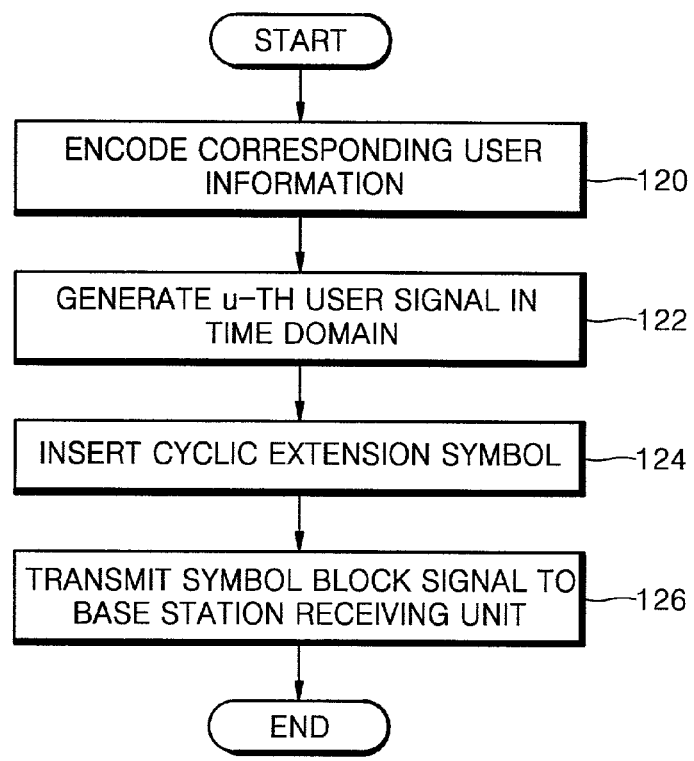
FIG. 7 is a flowchart of a data communication method performed by the user transmitting unit shown in FIG. 6 according to the present invention.

FIG. 7 is a flowchart of a data communication method performed by the user transmitting unit 12 shown in FIG. 6 transmitting user information to the base station receiving unit 22 according to the present invention. In steps 120 and 122, a user signal is generated from a user symbol obtained by encoding user information. In steps 124 and 126, a symbol block completed by inserting a cyclic extension symbol into the generated user signal is transmitted.

The user transmitting unit 12 of FIG. 6 included in a u-th user part 10 among the U user parts transmits corresponding user information to the base station receiving unit 22. For this, the (U+1)-th encoder 100 encodes corresponding user information received through an input terminal $IN_{U+1}$ to form a quadrature amplitude modulation (QAM) symbol or a phase shift keying (PSK) symbol and outputs the result of encoding to the user signal generator 102 as $N_u$ user symbols $A_m^{(u)}$ for the u-th user in step 120.

After step 120, the user signal generator 102 generates a u-th user signal $x_k^{(u)}$ in a time domain from the $N_u$ user symbols $A_m^{(u)}$ for the u-th user received from the (U+1)-th encoder 100, under the condition of frequency allocation expressed by Formula (2), as expressed by Formula (4), and outputs the generated u-th user signal $x_k^{(u)}$ to the second cyclic extension symbol inserter 104 in step 122.

$$x_k^{(u)} = a_{k \% N_u}^{(u)} \exp(j2\pi k n_u/N) \quad (4)$$

Here, $0 \leq k \leq N-1$, $k \% N_u$ indicates the remainder when "k" is divided by $N_u$, $a_k^{(u)}$ ($0 \leq k \leq N_u-1$) indicates the result of performing inverse Fourier transform on the $N_u$ user symbols $A_m^{(u)}$, and $x_k^{(u)}$ indicates the result of performing inverse Fourier transform on $X_n^{(u)}$.

For performing the step 122, the user signal generator 102 can include a second inverse Fourier transformer 110, a block repeater 112, and a multiplier 114. The second inverse Fourier transformer 110 performs $N_u$-point inverse Fourier transform on the $N_u$ user symbols $A_m^{(u)}$ for the u-th user received from the (U+1)-th encoder 100 and outputs the $N_u$ results $a_k^{(u)}$ of $N_u$-point inverse Fourier transform to the block repeater 112. The block repeater 112 defines the $N_u$ results $a_k^{(u)}$ of $N_u$-point inverse Fourier transform received from the second inverse Fourier transformer 110 as a single sub-block, repeats the single sub-block $L_u$ times to generate N symbols $a_{k'}^{(U)}$, and outputs the N symbols $a_{k'}^{(u)}$ to the multiplier 114. Here, k'=k % $N_u$ and indicates the remainder when "k" is divided by $N_u$. The multiplier 114 multiplies the N symbols $a_{k'}^{(u)}$ received from the block repeater 112 by $\gamma_u$ exp(j2πkn$_u$/N) and outputs the result $x_k^{(u)}$ of multiplication expressed by Formula (5) as a u-th user signal in a time domain to the second cyclic extension symbol inserter 104.

$$x_k^{(u)} = a_{k'}^{(u)} \cdot \gamma_u \exp(j2\pi k m_u/M) \qquad (5)$$

Here, $1 \leq k \leq N-1$, and $\gamma_u$ indicates a magnitude control factor for the u-th user signal $x_k^{(u)}$, for example, $L_u^{-0.5}$.

After step 122, the second cyclic extension symbol inserter 104 inserts a cyclic extension symbol into the u-th user signal $x_k^{(u)}$ received from the user signal generator 102 and outputs the result of insertion to the second signal transmitter 106 as a symbol block in step 124.

After step 124, the second signal transmitter 106 converts the symbol block received from the second cyclic extension symbol inserter 104 into a symbol block signal and transmits the symbol block signal to the base station receiving unit 22 in step 126.

Figure 8:
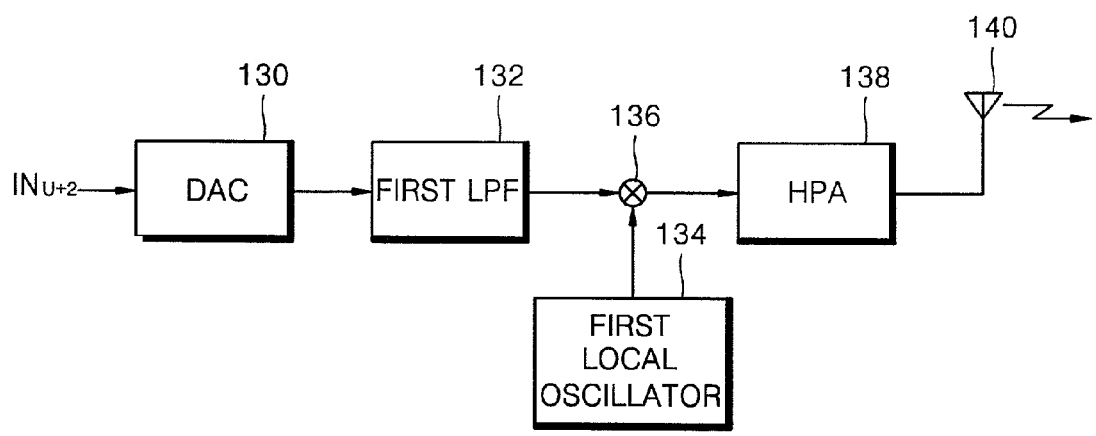
FIG. 8 is a block diagram of the general example of each of the first and second signal transmitters shown in FIGS. 4 and 6.

FIG. 8 is a block diagram of the general example of each of the first and second signal transmitters 70 and 106 shown in FIGS. 4 and 6. Each of the first and second signal transmitters 70 and 106 includes a digital-to-analog converter 130 (DAC), a first low-pass filter (LPF) 132, a first local oscillator 134, a multiplier 136, a high power amplifier (HPA) 138, and an antenna 140.

Referring to FIG. 8, the DAC 130 of the first or second signal transmitter 70 or 106 converts a symbol block received from the first or second cyclic extension symbol inserter 68 or 104 through an input terminal IN$_{U+2}$ into an analog signal and outputs the analog signal to the first LPF 132. Then, the first LPF 132 performs low-pass filtering on the analog signal received from the DAC 130 and outputs the result of low-pass filtering to the multiplier 136. The multiplier 136 multiplies the output of the first LPF 132 by a carrier signal having a frequency fc, which is output from the first local oscillator 134, to thus modulate the output of the first LPF 132 to form a signal having a center frequency of fc and outputs the result of modulation to the HPA 138. Then, the HPA 138 amplifies the output of the multiplier 136. The result of amplification is transmitted to the user receiving unit 14 or the base station receiving unit 22 through the antenna 140.

Hereinafter, the configuration and the operations of a preferred embodiment of the base station receiving unit 22 according to the present invention and a data communication method of the present invention through which the base station receiving unit 22 estimates a user symbol will be described with reference to the attached drawings.

Figure 9:
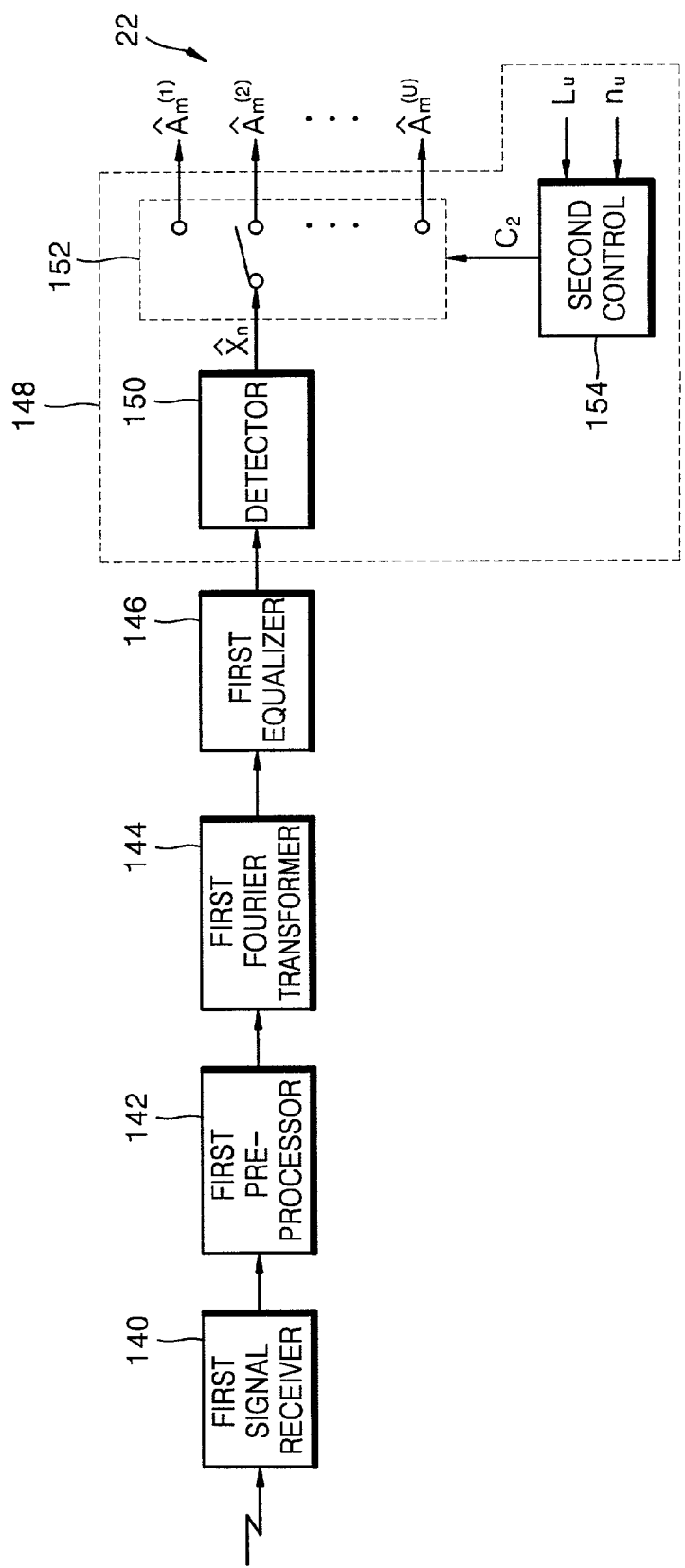
FIG. 9 is a block diagram of a base station receiving unit according to the present invention.

FIG. 9 is a block diagram of the base station receiving unit 22 according to the present invention. The base station receiving unit 22 includes a first signal receiver 140, a first pre-processor 142, a first Fourier transformer 144, a first equalizer 146, and a first estimate value detector 148.

Figure 10:
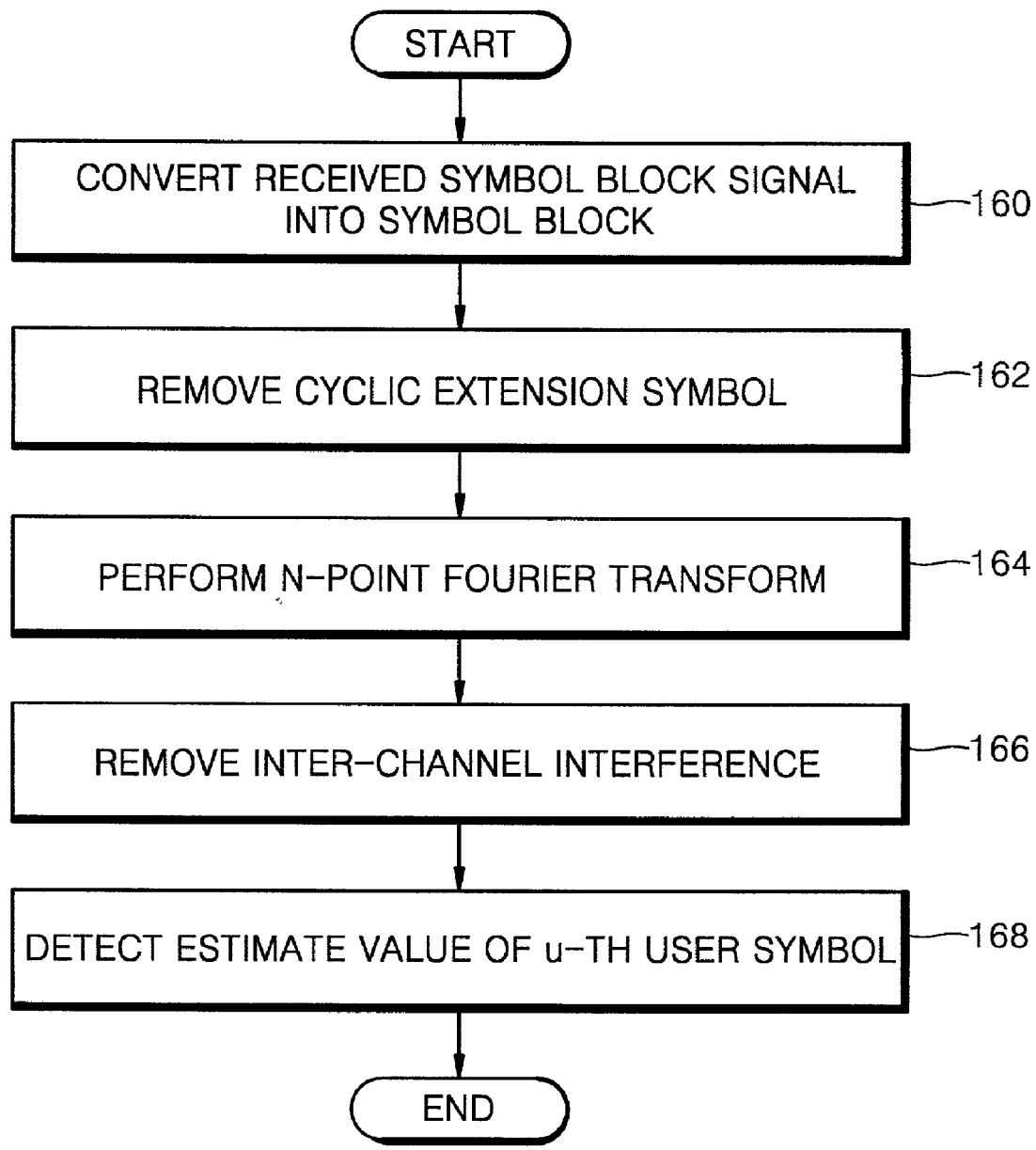
FIG. 10 is a flowchart of a data communication method performed by the base station receiving unit shown in FIG. 9 according to the present invention.

FIG. 10 is a flowchart of a data communication method performed by the base station receiving unit 22 shown in FIG. 9 estimating a user symbol according to the present invention. Fourier transform is performed on the result of removing a cyclic extension symbol from a received symbol block in steps 160 through 164. Inter-channel interference is removed from the result of Fourier conversion, and an estimate value of a user symbol is detected in steps 166 and 168.

The base station receiving unit 22 shown in FIG. 9 receives a symbol block signal transmitted from the user transmitting unit 12 included in the u-th user part 10 among U user parts and estimates a u-th user symbol from the received symbol block signal. For this, the first signal receiver 140 converts the symbol block signal received from the user transmitting unit 12 into a symbol block and outputs the symbol block to the first pre-processor 142 in step 160.

After step 160, the first pre-processor 142 finds the start point of the symbol block received from the first signal receiver 140, removes a cyclic extension symbol from the symbol block on the basis of the start point, and outputs the result $r_k$ of removing a cyclic extension symbol to the first Fourier transformer 144 in step 162.

After step 162, the first Fourier transformer 144 performs N-point Fourier transform on the result $r_k$ received from the first pre-processor 142 and outputs the result of N-point Fourier transform to the first equalizer 146 in step 164.

After step 164, the first equalizer 146 removes inter-channel interference from the result of N-point Fourier transform received from the first Fourier transformer 144 and outputs the result of removal to the first estimate value detector 148 in step 166. Here, inter-channel interference indicates interference occurring when a symbol block signal is transmitted from the user transmitting unit 12 to the base station receiving unit 22 through a channel.

After step 166, the first estimate value detector 148 detects an estimate value $\hat{A}_m^{(u)}$ of a u-th user symbol $A_m^{(u)}$ from the result of removing inter-channel interference received from the first equalizer 146 in step 168. For this, the first estimate value detector 148 may include a detector 150, a second switching unit 152, and a second controller 154.

The detector 150 detects an estimate value $\hat{X}_n$ of $X_n$ expressed by Formula (3) from the result of removing inter-channel interference received from the equalizer 146 and outputs the detected estimate value $\hat{X}_n$ to the second switching unit 152. The second switching unit 152 outputs the estimate value $\hat{X}_n$ received from the detector 150 as the estimate value $\hat{A}_m^{(u)}$ of the u-th user symbol in response to a second control signal C2 received from the second controller 154. For this, like the first controller 82, the second controller 154 generates the second control signal C2 using $L_u$ and $n_u$ and output it to the second switching unit 152.

Hereinafter, the configuration and the operations of a preferred embodiment of the user receiving unit 14 according to the present invention and a data communication method of the present invention through which the user receiving unit 14 estimates a user symbol will be described with reference to the attached drawings.

Figure 11:
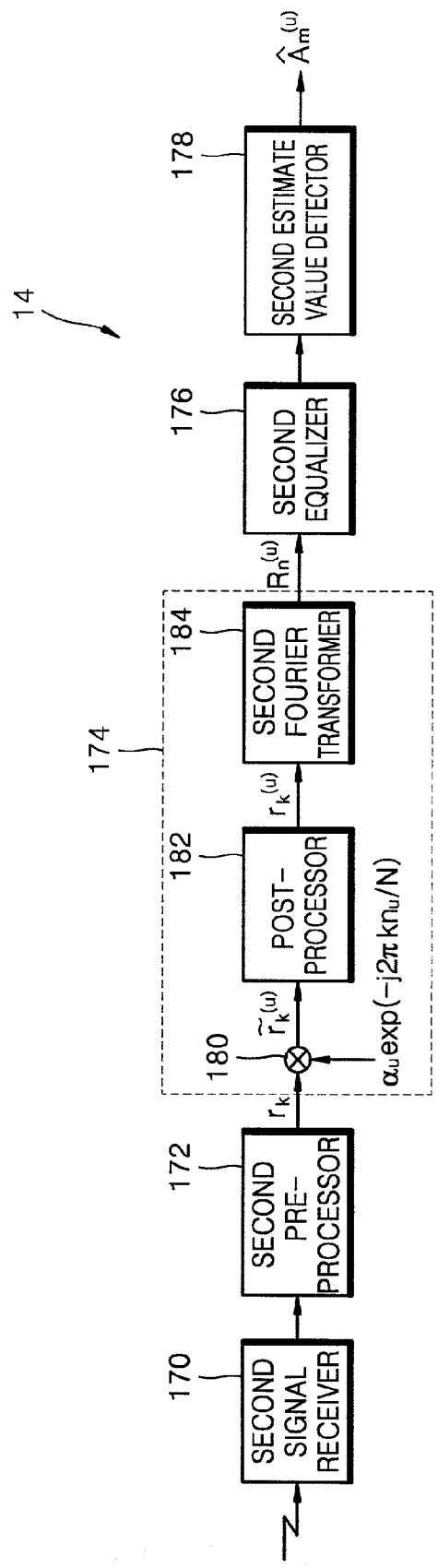
FIG. 11 is a block diagram of a user receiving unit according to the present invention.

FIG. 11 is a block diagram of the user receiving unit 14 according to the present invention. The user receiving unit 14 includes a second signal receiver 170, a second pre-processor 172, a user signal extractor 174, a second equalizer 176, and a second estimate value detector 178.

Figure 12:
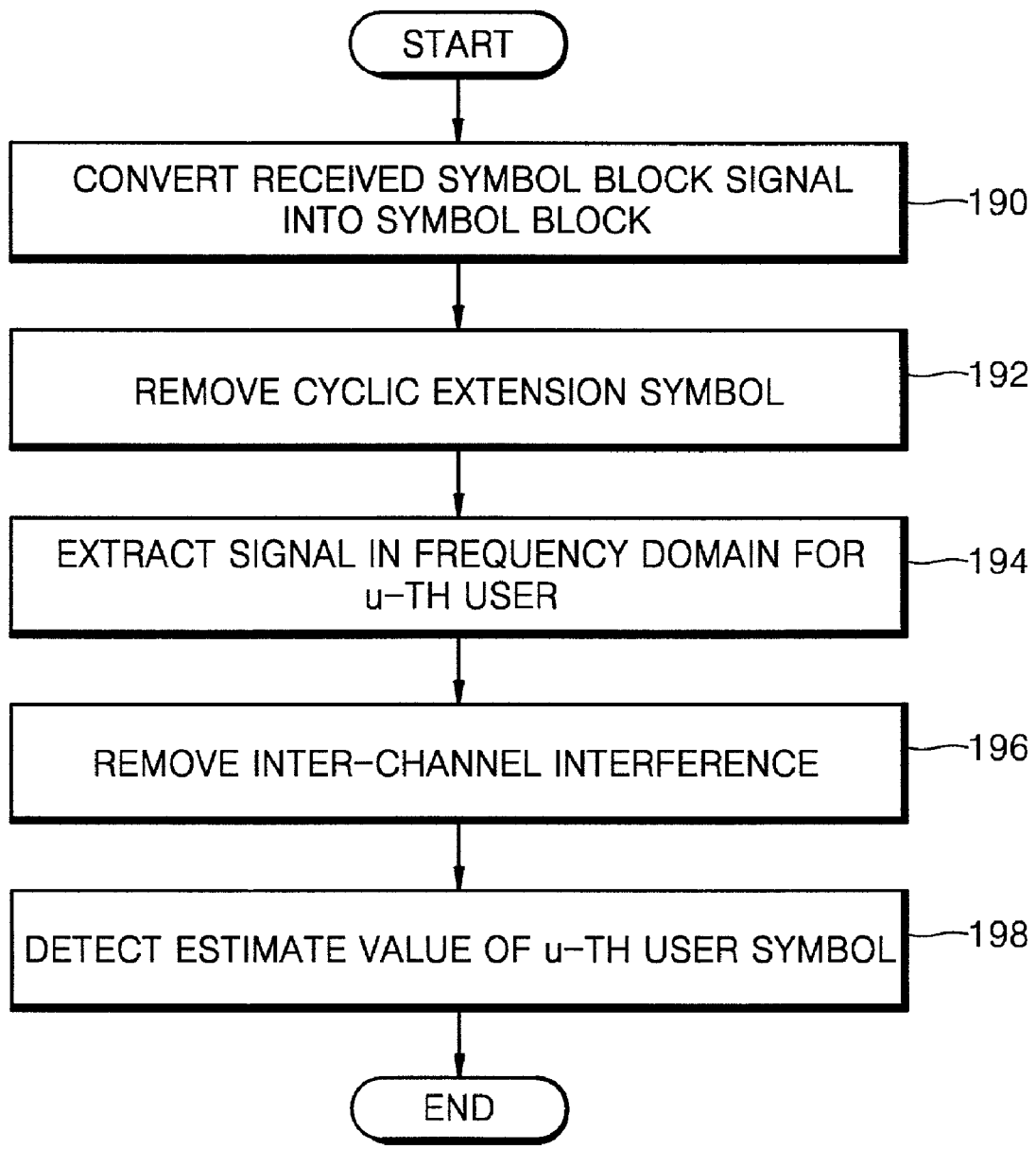
FIG. 12 is a flowchart of a data communication method performed by the user receiving unit shown in FIG. 11 according to the present invention.

FIG. 12 is a flowchart of a data communication method performed by the user receiving unit 14 shown in FIG. 11 estimating a user symbol according to the present invention. A user signal in a frequency domain is extracted from the result of removing a cyclic extension symbol from a received symbol block in steps 190 through 194. Inter-channel interference is removed from the user signal in a frequency domain, and an estimate value of a user symbol is detected in steps 196 and 198.

The user receiving unit 14 shown in FIG. 11 receives a symbol block signal transmitted from the base station transmitting unit 24 and estimates a u-th user symbol from the received symbol block signal. For this, the second signal receiver 170 converts the received symbol block signal into a symbol block and outputs the symbol block to the second pre-processor 172 in step 190.

After step 190, the second pre-processor 172 finds the start point of the symbol block received from the second signal receiver 170, removes a cyclic extension symbol from the symbol block on the basis of the start point, and outputs the result $r_k$ of removing a cyclic extension symbol to the user signal extractor 174 in step 192. The result $r_k$ is expressed by Formula (6).

$$r_k = \sum_{l=0}^{L-1} x_{(k-l+N)\%N} h_l + n_k = x_k \otimes h_k + n_k \quad (6)$$

Here, k=0, 1, . . . , or N−1, and $x_k$ indicates a user signal before a cyclic extension symbol is inserted by the base station transmitting unit 24. For example, $x_k$ corresponds to the output of the first inverse Fourier transformer 66 shown in FIG. 4. In addition, (k−l+N)%N indicates the remainder when (k−l+N) is divided by N, $\otimes$ indicates circular convolution, and $n_k$ indicates a noise characteristic in a time domain. In other words, for each block of $r_k$, circular convolution is performed on a user signal $x_k$ and a channel impulse response $h_k$.

After step 192, the user signal extractor 174 extracts a signal $R_n^{(u)}$ in a frequency domain for a u-th user from the $r_k$, which is received from the second pre-processor 172 and expressed by Formula (6), and outputs the signal $R_n^{(u)}$ expressed by Formula (7) to the second equalizer 176 in step 194.

$$R_n^{(u)} = BA_m^{(u)} H_n^{(u)} + N'_n \quad (7)$$

Here, $0 \leq n \leq N_u-1$, B indicates a size control factor, $H_n^{(u)}$ indicates a channel characteristic in a frequency domain, i.e., a value obtained by performing $N_u$-point Fourier transform on $\exp(-j2\pi k n_u/N) \cdot h_k$, and $N'_u$ indicates a noise characteristic in a frequency domain.

For performing the step 194, the user signal extractor 174 may include a multiplier 180, a post-processor 182, and a second Fourier transformer 184. The multiplier 180 multiplies the result $r_k$, which is received from the second pre-processor 172 and expressed by Formula (6), by $\alpha_u \exp(-j2\pi k n_u/N)$ and outputs the result $\tilde{r}_k^{(u)}$ of multiplication expressed by Formula (8) to the post-processor 182.

$$\tilde{r}_k^{(u)} = r_k \alpha_u \exp(-j2\pi k n_u/N) \quad (8)$$

Here, $0 \leq k \leq N-1$, and $\alpha_u$ indicates a size control factor for the result $\tilde{r}_k^{(u)}$ of multiplication. For example, $\alpha_u$ can be set to $L_u^{-0.5}$.

Then, the post-processor 182 folds and adds the results $\tilde{r}_k^{(u)}$ of multiplication received from the multiplier 180 with a period of $N_v$ and outputs the result $r_k^{(u)}$ of folding and addition expressed by Formula (9) to the second Fourier transformer 184.

$$r_k^{(u)} = \sum_{l=0}^{L_u-1} \tilde{r}_{k+lN_u}^{(u)} \quad (9)$$

Here, $0 \leq k \leq N_u-1$. If the result of combining Formula (6) with Formula (8) is combined with Formula (9), $r_k^{(u)}$ expressed by Formula (9) is expressed by Formula (10).

$$r_k^{(u)} = (\gamma_u \alpha_u L_u) \sum_{l=0}^{L-1} a_{(k+N-l)\%N_u}^{(u)} \exp(-j2\pi l n_u/N) \cdot h_l + n'_k \quad (10)$$

Here, k=0, 1, . . . , or $M_u-1$, and (k+N−l)%$N_u$ indicates the remainder when (k+N−l) is divided by $N_u$. If $\alpha_u \gamma_u = 1/L_u$ is set, Formula (10) can be simplified.

The second Fourier transformer 184 performs $N_v$-point Fourier transform on the result $r_k^{(u)}$ of folding and addition, which is received from the post-processor 182 and expressed by Formula (10), and outputs the result $R_n^{(u)}$ of Fourier transform, which is expressed by Formula (7), to the second equalizer 176. Accordingly, the size control factor B in Formula (7) is $a_u \gamma_u L_u$.

After step 194, the second equalizer 176 removes inter-channel interference from the signal $R_n^{(u)}$, which is received from the user signal extractor 174 and expressed by Formula (7), and outputs the result of removal to the second estimate value detector 178 in step 196.

After step 196, the second estimate value detector 178 detects an estimate value $\hat{A}_n^{(u)}$ of a u-th user symbol $A_m^{(u)}$ from the result of removing inter-channel interference received from the second equalizer 176 in step 198.

Inverse Fourier transform performed by each of the first and second inverse Fourier transformers 66 and 110 shown in FIGS. 4 and 6 may be inverse discrete Fourier transform (IDFT) or inverse fast Fourier transform (IFFT). In this case, Fourier transform performed by each of the first and second Fourier transformers 144 and 184 shown in FIGS. 9 and 11 may be DFT or FFT.

Figure 13:
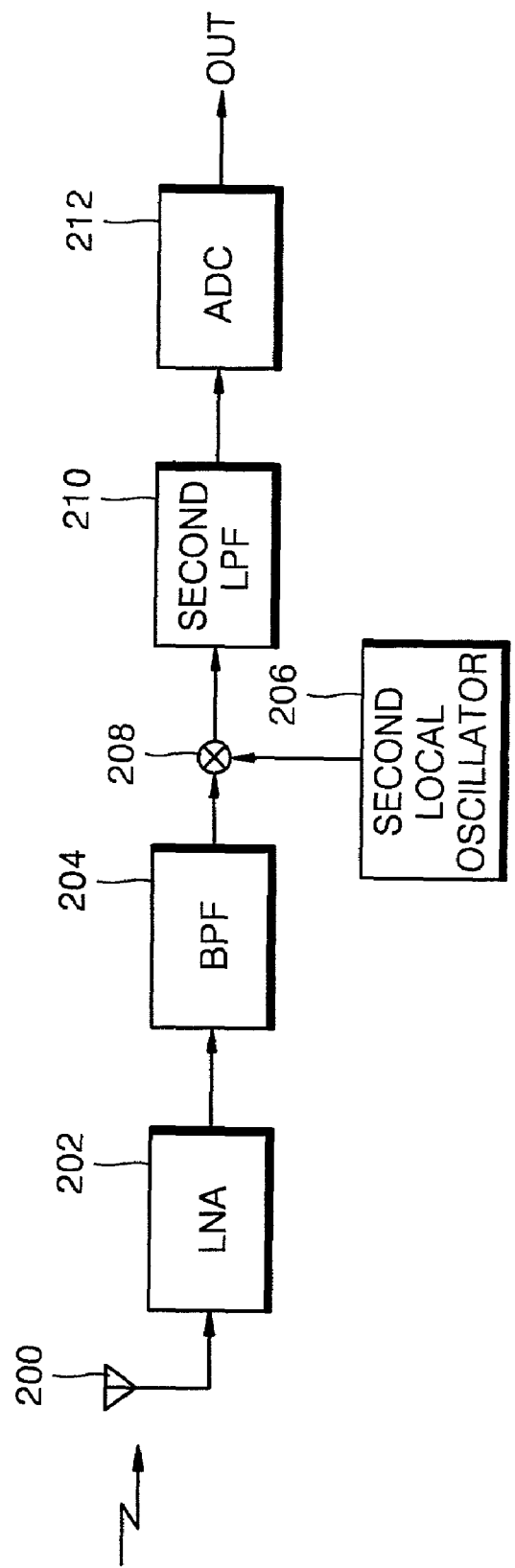
FIG. 13 is a block diagram of the general example of each of the first and second signal receivers shown in FIGS. 9 and 11.

FIG. 13 is a block diagram of the general example of each of the first and second signal receivers 140 and 170. Each of the first and second signal receivers 140 and 170 includes an antenna 200, a low noise amplifier (LNA) 202, a band-pass filter (BPF) 204, a second local oscillator 206, a multiplier 208, a second LPF 210, and an analog-to-digital converter (ADC) 212.

Referring to FIG. 13, the LNA 202 amplifies a symbol block signal received through the antenna 200 and outputs the result of amplification to the BPF 204. The BPF 204 performs band-pass filtering on the result of amplification received from the LNA 202 and outputs the result of band-pass filtering to the multiplier 208. The multiplier 208 multiplies the result of band-pass filtering received from the BPF 204 by a carrier signal having a frequency-fc received from the second local oscillator 206 and outputs the result of multiplication as a baseband signal to the second LPF 210. The LPF 210 performs low-pass filtering on the baseband signal and outputs the result of low-pass filtering to the ADC 212. The ADC 212 converts an analog signal resulting from low-pass filtering in the second LPF into a digital signal and outputs the digital signal as a symbol block to the first or second pre-processor 142 or 172 through an output terminal OUT.

Meanwhile, if a frequency $S_u$ allocated to each user is set as shown in Formula (2), a frequency offset number $n_u$ must be set to satisfy Formula (11) so that frequencies allocated to user symbols do not overlap.

$$S_i \cap S_j \neq 0 \quad (11)$$

Here, i≠j.

Hereinafter, a data communication method for obtaining a frequency offset number $n_u$ satisfying the condition of Formula (11) according to the present invention will be described with reference to the attached drawings.

Figure 14:
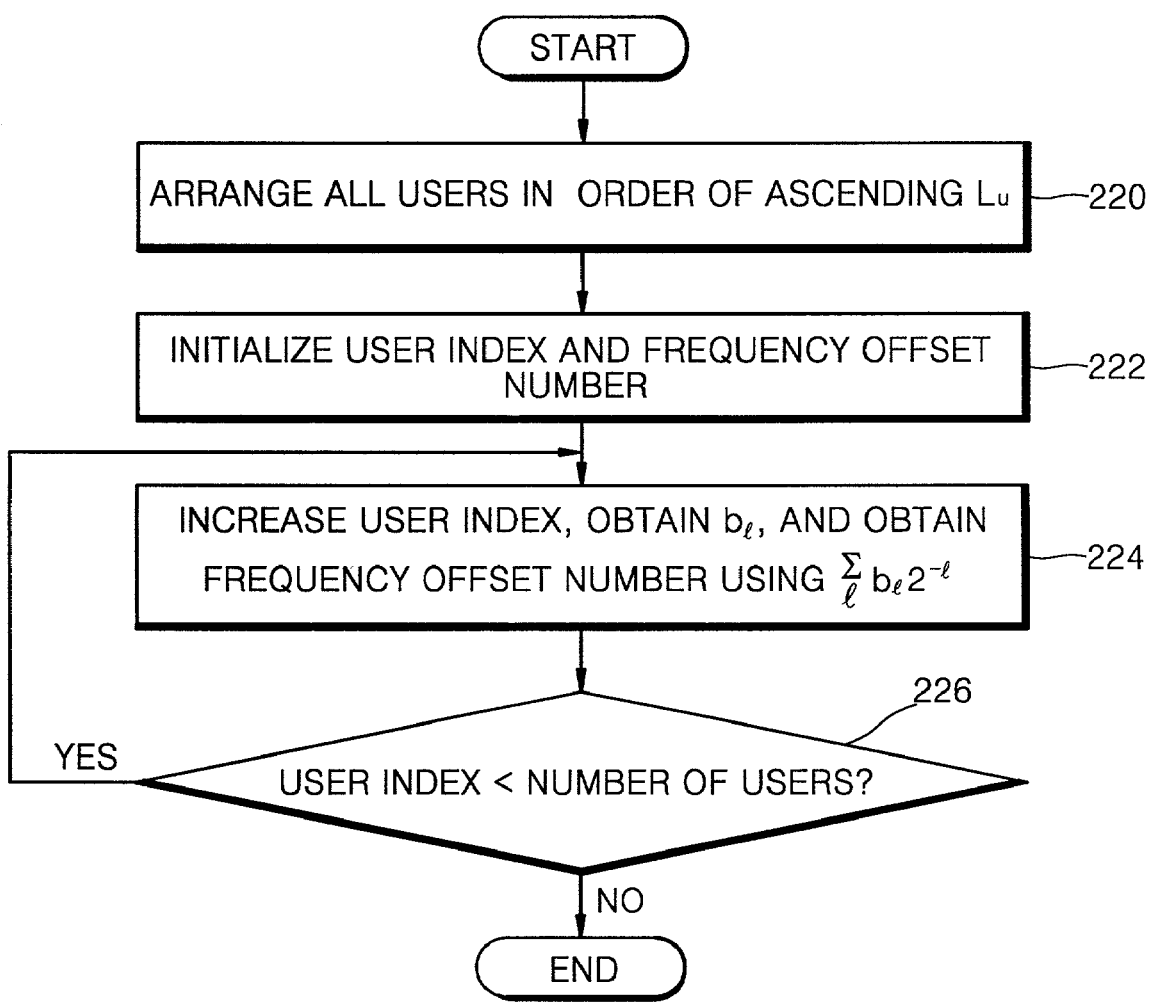
FIG. 14 is a flowchart of a data communication method for obtaining a frequency offset number according to the present invention.

FIG. 14 is a flowchart of a data communication method for obtaining a frequency offset number $n_u$ according to the present invention. In steps 220 through 226, a frequency offset number $n_u$ is obtained using the value of $L_u$.

Referring to FIG. 14, a data communication method based on OFDMA according to the present invention includes arranging U users in order of ascending $L_u$ in step 220. After step 220, a user index "u" and a frequency offset number $n_u$ are initialized in step 222.

After step 222, the user index "u" is increased by 1, the value of $b_l \in \{0, 1\}$ satisfying Formula (12) is obtained, and the frequency offset number $n_u$ expressed by Formula (13) is obtained using $b_l$ obtained from Formula (12), in step 224.

$$\sum_{i=1}^{u-1} L_i^{-1} = \sum_l b_l 2^{-l} \qquad (12)$$

$$n_u = \sum_l b_l 2^{l-1} \qquad (13)$$

After step 224, it is determined whether the user index "u" is less than the number U of users in step 226. If it is determined that the user index "u" is less than the number U of users, the procedure goes to step 224. However, if it is determined that the user index "u" is not less than the number U of users, the procedure shown in FIG. 14 ends.

According to an embodiment of the present invention, the user index "u" and the frequency offset number $n_u$ can be initialized to 1 and 0, respectively, in step 222. In this case, the frequency offset number $n_u$ is obtained from Formula (13) in step 224.

According to another embodiment of the present invention, the user index "u" and the frequency offset number $n_u$ can be initialized to 1 and $L_1-1$, respectively, in step 222. In this case, the frequency offset number $n_u$ is obtained from Formula (14) in step 224.

$$n_u = L_u - 1 - \sum_l b_l 2^{l-1} \qquad (14)$$

Hereinafter, the fact that a plurality of users can share a single symbol block using the frequency offset number $n_u$ obtained as described above will be described with reference to the attached drawings. Here, it is assumed that the number U of users is 4.

Figure 15:
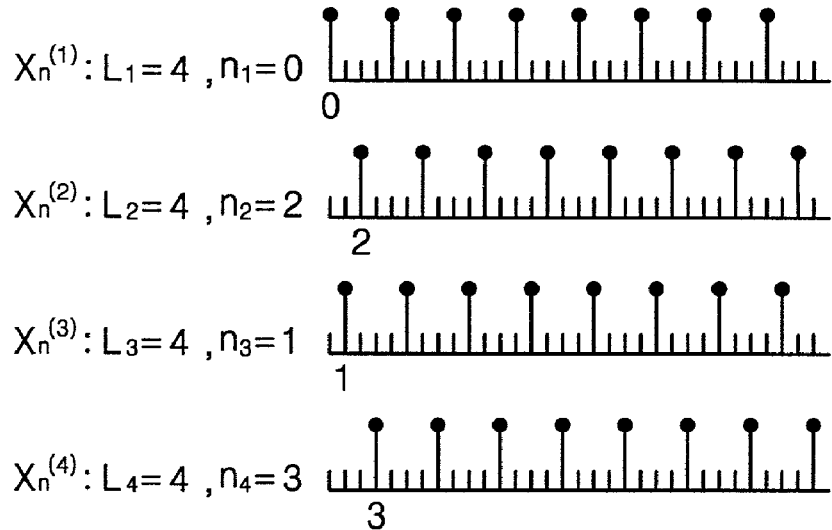
FIG. 15 is a diagram illustrating symbols in a frequency domain when four users simultaneously transmit information at the same speed.

FIG. 15 is a diagram illustrating symbols $X_n^{(1)}$, $X_n^{(2)}$, $X_n^{(3)}$, and $X_n^{(4)}$ in a frequency domain when four users simultaneously transmit information at the same speed. Referring to FIG. 15, when four users share N main symbols, that is, each of the users transmits $N_u(=N/4)$ user symbols ($L_1=4$, $L_2=4$, $L_3=4$, and $L_4=4$, frequency offset numbers $n_u$, i.e., $n_1$, $n_2$, $n_3$, and $n_4$, allocated to the respective four users are 0, 2, 1, and 3, respectively. Here, the N/4 symbols allocated to a u-th user are repeated four times to form main symbols having a size of N. The main symbols having a size of N have a frequency characteristic that a symbol $X_n^{(1)}$, $X_n^{(2)}$, $X_n^{(3)}$, $X_n^{(4)}$ is non-zero only at a frequency of 4n (n=0, 1, . . . , (N/4)−1) and is 0 other frequencies, as shown in FIG. 15.

If the frequencies of the main symbols having a size of N are shifted by the frequency offset number $n_u$ due to multiplication of the main symbols having a size of N by $\exp(j2\pi k n_u/N)$, the symbol $X_n^{(1)}$, $X_n^{(2)}$, $X_n^{(3)}$, or $X_n^{(4)}$ is not 0 only at of $4n'+n_u$ and is 0 at the other frequencies. Consequently, as shown in FIG. 15, the symbols $X_n^{(1)}$, $X_n^{(2)}$, $X_n^{(3)}$, and $X_n^{(4)}$ in a frequency domain for the four users occupy different frequency ranges so that signals do not interfere with one another in a frequency domain.

Figure 16:
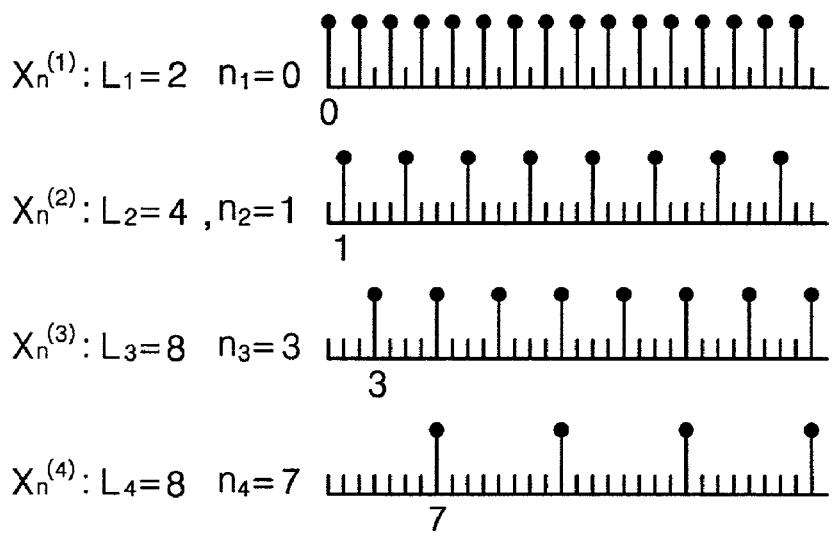
FIG. 16 is a diagram illustrating symbols in a frequency domain when four users simultaneously transmit information at different speeds.

FIG. 16 is a diagram illustrating symbols $X_n^{(1)}$, $X_n^{(2)}$, $X_n^{(3)}$, and $X_n^{(4)}$ in a frequency domain when four users simultaneously transmit information at different speeds. Referring to FIG. 16, when four users share N main symbols in different manners, that is, the four users transmit N/2 user symbols ($L_1=2$), N/4 user symbols ($L_2=4$), N/8 user symbols ($L_3=8$), and N/8 user symbols ($L_4=8$), respectively, frequency offset numbers $n_u$, i.e., $n_1$, $n_2$, $n_3$, and $n_4$, allocated to the respective four users are 0, 1, 3, and 7, respectively. Here, N/2 symbols are repeated two times to form main symbols having a size of N for a first user, N/4 symbols are repeated four times to form main symbols having a size of N for a second user, N/8 symbols are repeated eight times to form main symbols having a size of N for a third user, and N/8 symbols are repeated eight times to form main symbols having a size of N for a fourth user.

Next, if main symbols having a size of N are multiplied by $\exp(j2\pi k n_u/N)$, as shown in FIG. 16, the symbols $X_n^{(1)}$, $X_n^{(2)}$, $X_n^{(3)}$, and $X_n^{(4)}$ in a frequency domain for the four users occupy different frequency ranges so that signals do not interfere with one another in a frequency domain.

Unlike a conventional user transmitting unit using an N-point inverse Fourier transformer, the user transmitting unit 12 shown in FIG. 6 according to the present invention uses a single multiplier and an $N_u$-point inverse Fourier transformer to transmit a symbol block signal to the base station receiving unit 22. Unlike a conventional user receiving unit using an N-point Fourier transformer, the user receiving unit 14 shown in FIG. 11 according to the present invention uses a single multiplier and an $N_u$-point Fourier transformer to estimate a user symbol transmitted from the base station transmitting unit 24.

As described above, according to a data communication apparatus and method based on OFDMA of the present invention, a user part uses an $N_u$-point inverse Fourier transformer and an $N_u$-point Fourier transformer which are much simpler in hardware than an N-point inverse Fourier transformer and an N-point Fourier transformer when transmitting information and receiving information in units of symbol blocks each having N main symbols. Therefore, the hardware of a user part can be optionally simplified by appropriately determining the value of $N_u$. Since the hardware of a user part is not complicated, a data communication apparatus can be easily implemented. In addition, the present invention greatly increases communication efficiency compared to conventional data communication based on OFDMA in a given channel environment. According to the present invention, different types of user parts having different complexities due to different values of $N_u$ can communicate with a base station part using a single data format.

What is claimed is:

1. A data communication apparatus based on orthogonal frequency division multiple access (OFDMA) comprising a base station transmitting unit which transmits user information for at least one user, the base station transmitting unit comprising:

first through U-th encoders among which a u-th encoder (where $1 \leq u \leq U$, and U indicates the number of users) encodes the user information and outputs the result of encoding as $N_u$ u-th user symbols (where $N_u$ is the number of symbols allocated to a u-th user);

a frequency allocator for allocating different frequencies to the user symbols received from each of the first through U-th encoders and outputting the results of allocation;

a first inverse Fourier transformer for performing N-point inverse Fourier transform on the results of allocation received from the frequency allocator (where N is a total number of symbols which can be allocated to the U users);

a first cyclic extension symbol inserter for inserting a cyclic extension symbol into the result of inverse Fourier transform; and a first signal transmitter for converting the result of insertion into a symbol block signal and transmitting the symbol block signal to the user, wherein the sum of $N_1$ through $N_U$ is no greater than N.

2. The data communication apparatus of claim 1, wherein the frequency allocator comprises:

a first switching unit for selecting one out of the results of encoding received from the first through U-th encoders in response to a first control signal and outputting the selected one as the results $X_n$ of allocation, which is expressed by the following formula, to the first inverse Fourier transformer, $$X_n = \sum_{u=1}^{U} X_n^{(u)}$$

where "n" is a frequency index and satisfies $0 \leq n \leq N$, $A_m^{(u)}$ indicates the u-th user symbol, $0 \leq m < N_u$, and if $L_u$ is $N/N_u$ and $n_u$ indicates a frequency offset number allocated to the u-th user, $X_n^{(u)} = A_m^{(u)}$ only when $n = mL_u + n_u$, and, $X_n^{(u)} = 0$ when $n \neq mL_u + n_u$; and a first controller for generating the first control signal using $L_u$ and $N_u$.

3. A data communication apparatus based on orthogonal frequency division multiple access (OFDMA) comprising U user transmitting units each of which transmits user information to a base station part, a u-th user transmitting unit ($1 \leq u \leq U$) among the U user transmitting units comprising:

a (U+1)-th encoder for encoding the user information and outputting the result of encoding as $N_u$ u-th user symbols (where $N_u$ is the number of symbols allocated to a u-th user);

a user signal generator for generating a u-th user signal $x_k^{(u)}$ in a time domain from the u-th user symbol $A_m^{(u)}$ (where $0 \leq m < N_u$) received from the (U+1)-th encoder according to the following formula and outputting the generated u-th user signal $x_k^{(u)}$, $$x_k^{(u)} = a_{k \% N_u}^{(u)} \exp(j2\pi k n_u/N)$$

where $0 \leq k \leq N-1$, N is a total number of symbols which can be allocated to the U users and is at least the sum of $N_1$ through $N_U$, k % $N_u$ indicates the remainder when "k" is divided by $N_u$, $a_k^{(u)}$ indicates the result of performing inverse Fourier transform on the $N_u$ user symbols $A_m^{(u)}$, and $n_u$ indicates a frequency offset number allocated to a u-th user;

a first cyclic extension symbol inserter for inserting a cyclic extension symbol into the u-th user signal; and a first signal transmitter for converting the result of insertion into a symbol block signal and transmitting the symbol block signal to the base station part, wherein $1 \leq N_U \leq N$.

4. The data communication apparatus of claim 3, wherein the user signal generator comprises:

a first inverse Fourier transformer for performing $N_u$-point inverse Fourier transform on the $N_u$ u-th user symbols $A_m^{(u)}$ received from the (U+1)-th encoder and outputting the result $a_k^{(u)}$ of inverse Fourier transform;

a block repeater for repeating the result $a_k^{(u)}$ of inverse Fourier transform $L_u$ ($L_u = N/N_u$) times to generate N symbols; and a multiplier for multiplying the N symbols by $\gamma_u \exp(j2\pi k n_u/N)$ and outputting the result of multiplication as the u-th user signal $x_k^{(u)}$ to the first cyclic extension symbol inserter.

5. The data communication apparatus of claim 4, further comprising a base station receiving unit which receives the symbol block signal transmitted from each of the U user transmitting units and estimates the u-th user symbol from the received symbol block signal, the base station receiving unit comprising:

a first signal receiver for converting the received symbol block signal into a symbol block and outputting the symbol block;

a first pre-processor for finding a start point of the symbol block received from the first signal receiver, removing the cyclic extension symbol from the symbol block on the basis of the start point, and outputting the result $r_k$ of removal;

a first Fourier transformer for performing N-point Fourier transform on the result $r_k$ of removal received from the first pre-processor;

a first equalizer for removing inter-channel interference from the result of Fourier transform received from the first Fourier transformer; and a first estimate value detector for detecting an estimate value of the u-th user symbol $A_m^{(u)}$ from the result of removal received from the first equalizer.

6. The data communication apparatus of claim 5, wherein the first estimate value detector comprises:

a detector for detecting an estimate value $\hat{X}_n$ of $X_n$ (where "n" is a frequency index and satisfies $0 \leq n \leq N$), which is expressed by the formula, from the result of removing inter-channel interference received from the first equalizer, $$X_n = \sum_{u=1}^{U} X_n^{(u)}$$

where $X_n^{(u)}$ indicates the u-th user signal in a frequency domain with respect to $x_k^{(u)}$;

a second switching unit for outputting the estimate value $\hat{X}_n$ as the estimate value of the u-th user symbol in response to a second control signal; and a second controller for generating the second control signal using $L_u$ and $n_u$.

7. The data communication apparatus of claim 1, further comprising a user receiving unit which receives the symbol block signal transmitted from the base station transmitting units and estimates the u-th user symbol from the received symbol block signal, the user receiving unit comprising:

a first signal receiver for converting the received symbol block signal into a symbol block and outputting the symbol block;

a first pre-processor for finding a start point of the symbol block received from the first signal receiver, removing the cyclic extension symbol from the symbol block on the basis of the start point, and outputting the result $r_k$ (where "k" indicates a time index and satisfies $0 \leq k \leq N-1$) of removal;

a user signal extractor for extracting a signal $R_n^{(u)}$ in a frequency domain for a u-th user from the result $r_k$ received from the first pre-processor according to the following formula, $$R_n^{(u)} = BA_m^{(u)} H_n^{(u)} + N'_n$$

where n is a frequency index and satisfies $0 \leq n \leq N_n - 1$, B indicates a size control factor, $H_n^{(u)}$ indicates a channel characteristic in a frequency domain, and $N'_u$ indicates a noise characteristic in a frequency domain;

a first equalizer for removing inter-channel interference from the signal $R_n^{(u)}$ received from the user signal extractor; and a first estimate value detector for detecting an estimate value $\hat{A}_m^{(u)}$ of the u-th user symbol $A_m^{(u)}$ from the result of removal received from the first equalizer.

8. The data communication apparatus of claim 7, wherein the user signal extractor comprises:

a first multiplier for multiplying the result $r_k$ received from the second pre-processor by $\alpha_u \exp(-j2\pi k n_u/N)$ (where $\alpha_u$ indicates a size control factor) and outputting the result of multiplication;

a post-processor for folding and adding the results of multiplication received from the first multiplier with a period of $N_v$ and outputting the result of folding and addition; and a second Fourier transformer for performing $N_v$-point Fourier transform on the result of folding and addition received from the post-processor and outputting the result of Fourier transform as the signal $R_n^{(u)}$.

9. A data communication method based on orthogonal frequency division multiple access (OFDMA) through which the base station transmitting unit of the data communication apparatus of claim 1 transmits user information to one or more users, the data communication method comprising the steps of:

encoding each of U pieces of user information to obtain $N_u$ user symbols for each of the users;

allocating different frequencies to the respective user symbols for each of the users;

performing inverse Fourier transform on the results of frequency allocation;

inserting a cyclic extension symbol into the result of inverse Fourier transform; and converting the result of insertion into a symbol block signal and transmitting the symbol block signal to the user.

10. A data communication method based on orthogonal frequency division multiple access (OFDMA) through which the u-th user transmitting unit of the data communication apparatus of claim 3 transmits the user information to the base station part, the data communication method comprising the steps of:

encoding the user information to obtain $N_u$ u-th user symbols;

generating a u-th user signal $x_k^{(u)}$ in a time domain from the u-th user symbols $A_m^{(u)}$ according to the following formula, $$x_k^{(u)} = a_{k \% N_u}^{(u)} \exp(j2\pi k n_u/N);$$

inserting the cyclic extension symbol into the u-th user signal; and transmitting the result of insertion to the base station part as the symbol block signal.

11. A data communication method based on orthogonal frequency division multiple access (OFDMA) through which the base station receiving unit of the data communication apparatus of claim 5 estimates the u-th user symbol from the received symbol block signal, the data communication method comprising the steps of:

converting the received symbol block signal into the symbol block;

finding the start point of the symbol block and removing the cyclic extension symbol from the symbol block on the basis of the start point;

performing N-point Fourier transform on the result $r_k$ of removal of the cyclic extension symbol;

removing the inter-channel interference from the result of Fourier transform; and detecting the estimate value of the u-th user symbol $A_m^{(u)}$ from the result of removal of the inter-channel interference.

12. A data communication method based on orthogonal frequency division multiple access (OFDMA) through which the user receiving unit of the data communication apparatus of claim 7 estimates the u-th user symbol from the received symbol block signal, the data communication method comprising the steps of:

converting the received symbol block signal into the symbol block;

finding the start point of the symbol block and removing the cyclic extension symbol from the symbol block on the basis of the start point;

extracting the signal $R_n^{(u)}$ from the result $r_k$ of removal of the cyclic extension symbol;

removing the inter-channel interference from the signal $R_n^{(u)}$; and detecting the estimate value $\hat{A}_m^{(u)}$ of the u-th user symbol $A_m^{(u)}$ from the result of removal of the inter-channel interference.

13. A data communication method based on orthogonal frequency division multiple access (OFDMA) through which the frequency offset number is obtained in the data communication apparatus of claim 2, the data communication method comprising the steps of:

(a) arranging users in order of ascending $L_u$;

(b) initializing the user index "u" and the frequency offset number;

(c) increasing the user index "u" by 1, obtaining a value of $b_i \in \{0, 1\}$ satisfying $$\sum_{i=1}^{u-1} L_i^{-1} = \sum_i b_i 2^{-i},$$

and obtaining the frequency offset number using $$\sum_i b_i 2^{i-1};$$

and (d) determining whether the user index "u" is less than the number of users and going to the step (c) if it is determined that the user index "u" is less than the number of users.

14. The data communication method of claim 13, wherein the step (b) comprises initializing the user index "u" and the frequency offset number to 1 and 0, respectively, and the step (c) comprises determining $$\sum_i b_i 2^{i-1}$$

as the frequency offset number.

15. The data communication method of claim 13, wherein the step (b) comprises initializing the user index "u" and the frequency offset number to 1 and $L_1-1$, respectively, and the step (c) comprises determining $$L_u - 1 - \sum_i b_i 2^{i-1}$$

as the frequency offset number.

* * * * *